United States Patent [19]

Watanabe et al.

[11] Patent Number: 5,022,999

[45] Date of Patent: Jun. 11, 1991

[54] METHOD OF TREATING STARCH-CONTAINING WATER

[75] Inventors: Naotaka Watanabe, Tokyo; Hiroshi Itoda; Reiko Funato, both of Kanagawa, all of Japan

[73] Assignee: Mitsui-Cyanamid, Ltd., Tokyo, Japan

[21] Appl. No.: 411,091

[22] Filed: Sep. 22, 1989

[51] Int. Cl.$^5$ ................................................ C02F 1/56
[52] U.S. Cl. .................................. 210/692; 210/667; 210/727; 210/734; 210/735
[58] Field of Search ............... 210/692, 725, 727, 728, 210/732–735, 666, 667

[56] References Cited

U.S. PATENT DOCUMENTS

| | | | |
|---|---|---|---|
| 3,235,490 | 2/1966 | Goren | 210/728 |
| 3,868,320 | 2/1975 | Hider et al. | 210/727 |
| 3,968,037 | 7/1976 | Morgan et al. | 210/735 |
| 4,759,856 | 7/1988 | Farrar et al. | 210/738 |
| 4,816,164 | 3/1989 | Presley | 210/727 |

FOREIGN PATENT DOCUMENTS

| | | | |
|---|---|---|---|
| 49-3464 | 1/1974 | Japan | 210/727 |
| 54-073463 | 6/1979 | Japan | 210/727 |
| 60-129184 | 7/1985 | Japan | 210/728 |
| 63-2332888 | 9/1988 | Japan | 210/728 |

*Primary Examiner*—Peter Hruskoci
*Attorney, Agent, or Firm*—Wenderoth, Lind & Ponack

[57] ABSTRACT

A method of treating starch-containing water comprises the step of adding water swellable, cationic polymerizate particles to the starch-containing water. The starch is soluble starch. The water-swellable cationic polymer particles are polymer particles of a crosslinking monomer and either a cationic vinyl monomer or a cationic vinyl monomer and a nonionic vinyl monomer.

3 Claims, No Drawings

METHOD OF TREATING STARCH-CONTAINING WATER

BACKGROUND OF THE INVENTION

1. Field of the Invention

The present invention relates to a method of treating starch-containing water and more particularly to a method of treating starch-containing water discharged from plants in the starch manufacturing industry; starch processing industry; food, dying and paperboard industries which utilize starch or starch derivatives; brewing industry; and rice-cake and confectionery industries, etc.

2. Description of the Background Art

Starch-Containing water discharged from plants which make use of starch will cause environmental pollution if it is directly discharged into rivers. For this reason, a reduction of starch content in discharged water down to a standard level or lower is required of these industries.

Prior methods of treating such waste water have included chemical or biological treatments.

Specific examples of the method of chemically treating starch-containing water include adding (1) an inorganic flocculant such as aluminum sulfate, (2) an organic polymer flocculant, or (3) a melamine/aldehyde acid colloidal solution consisting of alkyletherified methylol melamine and acid via a flocculation-precipitation process.

Biological waste water treating methods are also known to implement active sludge treating.

Under the chemical treating methods (1)-(2) of the prior art, soluble starch is not removable efficiently. With respect to the method (3), acid resistant equipment and apparatus is required because the additive is a strong acid. Although the soluble starch is removable, pH adjustment of the treating liquid is also required. Even if a large amount of agent is used, it still remains unfeasible to efficiently remove soluble starch using these chemical treating methods and furthermore, the compactness of the resultant precipitate becomes poor if the agent is made insoluble. Also, the throughput of the discharged water tends to decrease, the amount of the precipitated sludge tends to increase, and the loading accordingly tends to become greater.

In addition to the foregoing disadvantages, a further problem is that the active sludge treating method requires skill in operation control, a large area for facilities to be installed and a longer treating time.

The present inventors have completed the present invention as a result of studies intended for the solution of the foregoing disadvantages.

SUMMARY OF THE INVENTION

An object of the present invention is to provide a method of treating starch-containing water, characterized by adding water-swelling cationic polymer particles to starch-containing water.

By adding water-swelling, cationic polymer particles to starch-containing water, soluble starch which is difficult to remove by means of conventional cationic polymer becomes removable efficiently. Moreover, excellent economic efficiency is achieved because both acidic or alkaline pH adjuster and pH adjusting equipment can be dispensed with.

DESCRIPTION OF THE PREFERRED EMBODIMENTS

A detailed description will subsequently be given of the present invention.

Monomers useful in producing the water-swelling polymer applicable to the present invention comprises a cationic vinyl monomer, a nonionic water-soluble vinyl monomer, and a crosslinking monomer.

Typical examples of the cationic vinyl monomer include: (1) neutral salt or quaternary compound of dialkylaminoalkyl(meth)acrylate such as dimethylamino ethyl(meth)acrylate and diethylaminoethyl(meth) acrylate, (2) neutral salt or quaternary compound of dialkylaminoalkyl (meth)acrylamide such as dimethyl aminomethyl(meth)acrylamide and dimethylaminopropyl(meth) acrylamide, etc., (3) allyldialkylammonium chloride, (4) acryloxyalkyltrialkylammonium chloride, (5) N,N-dialkylaminoalkyl (meth)acrylate.

Typical examples of the nonionic water-soluble vinyl monomer include: (meth)acrylamide, vinylmethylether, vinylethylether, vinylpyrrolidone, N,N-dialkyl(meth) acrylamides, N-vinylmethacetamide etc.

Typical examples of the crosslinking monomer include: divinyl compound of N,N-methylenebis(meth) acrylamide, divinylbenzene, vinylmethylol compound of acrolein, methylacrylamide glycolate methylether, polyethylene glycoldi(meth)acrylate; glycidyl acrylate, glyoxal, epichlorohydrin etc.

The amount of the cationic vinyl monomer component in the water-swelling cationic polymer should be 50-100 wt % and preferably 70-100 wt %; if it is less than 50 wt %, treating efficiency will be lowered. Correspondingly, 0-50 weight percent of the non-ionic vinyl monomer, preferably 0-30 weight percent, should be used, based on the total polymer weight.

The amount of the crosslinking monomer should be 0.001-5 wt % and preferably 0.005-1 wt %. If the amount thereof is less than 0.001 wt %, part of the monomer will become soluble and therefore fail to change into water-swelling particles, thus reducing the intended effect. If the amount thereof exceeds 5 wt %, the crosslinking density will become too great, which is not preferable because the resultant water-swelling property deteriorates thereby decreasing the interfacial area of the particle, thus reducing the intended effect. The water-swelling property of the polymer in pure water may be approximately 20-1,000 times and 2.5-10 times in terms of apparent volume and particle size, respectively.

The water-swelling cationic polymer particles employed in the present invention may be either fine polymer particles (a) in the form of an emulsion obtained through the known water-in-oil type dispersion-polymerization method or (b) prepared by crushing the powder obtained through known aqueous solution polymerization or water-in-oil type dispersion-polymerization methods. However, (a) the fine polymer particles in the form of an emulsion are preferred because a greater interface is available. In the case of the particles obtained from the powder, the particle size should preferably be approximately 1-100μ and more preferably not greater than 20μ.

A description will further be given of a method of implementing the present invention.

The method embodying the present invention comprises the step of adding water-swelling, cationic, polymer particles to starch-containing water. The amount of the polymer added is normally 1-several hundred percent per unit of starch: however, it is not limited thereto.

The concentration of the polymer varies with the extent to which it can be diluted in conformity with the degree of the water-swelling property. When its water-swelling property is 1,000 times, the polymer may be diluted with, e.g. water in amounts up to 0.1% or lower.

The polymer is added preferably in such a manner that it is diluted with water and swollen and then dispersed in water before being added. Incidentally, the water-swelling, cationic, polymer particles according to the present invention include those diluted and swollen with water, as described above.

In addition to the water-swelling, cationic, polymer particles of this invention, one may also use an inorganic coagulant of aluminum sulfate or ferric chloride; an organic coagulant including melamine/aldehyde acid colloidal solution; a polyalkylene polyamine, as represented by polyethylene-imine; a water-soluble dicyandiamide/formaldehyde condensate; a polydimethyldiallyl ammonium salt; a epichlorohydrin-amine condensate; cationic guar gum, etc. for treating the starch-containing water.

The water-swelling, cationic, polymer particles should preferably be added simultaneously with the organic or inorganic coagulants specified above or after the latter has been added.

If the water-swelling, cationic, polymer particles are added prior to the inorganic or organic coagulants, the polymer particles may act on COD components that can be removed only by means of the coagulants which is undesirable because efficiency is thereby decreased.

When the polymer particles are added as part of a flocculation-precipitation process, organic polymeric flocculant may be used simultaneously therewith. As the organic polymeric flocculant, one may use any known agent, among which agents of acrylamide are preferred; e.g. poly(meth)acrylamide or its partially hydrolyzed derivative; a copolymer of (meth)acrylamide and (meth)acrylic acid or its salt, etc. polymeric coagulant, it is normally added after the water-swelling cationic polymer particles are.

The mechanism by which starch is removed by the addition of the water-swelling cationic polymer particles has not yet been fully explained. However, it has been shown that starch can be removed from aqueous solution with the water-swelling, cationic polymer particles according to this invention, despite the fact that it cannot be removed by means of the addition of a water-soluble, cationic polymer. In consideration of the foregoing, it is assumed that the starch is adsorbed onto the surface of each water-swollen, cationic polymer particle and thereby removed from solution. It is clear that the starch is not removed solely because of the ionic properties involved.

As set forth above, the soluble starch can be processed simply, quickly and efficiently according to the present invention, though some problems still remain unsolved in treating it by prior art methods.

The present invention will subsequently be described concretely with reference to working examples.

EXAMPLES (1) Examples of preparation of water-in-oil type water-swelling cationic polymer particles 309.6 g of the methyl chloride quaternary of dimethylaminoethyl methacrylate and 0.09 g of N,N-methylene bisacrylamide are emulsified in 224.5 g of paraffin oil using a homogenizer in the presence of a nonionic surface-active agent having an HLB of 4.2. While the atmosphere is degassed with $N_2$ gas, water-soluble azo catalyst is successively added dropwise at a temperature of 40° C. for polymerization. After completion of polymerization, a nonionic surface-active agent having an HLB of 12.3 is added to abtain a stable emulsion. The emulsion particle size is approximately 5 $\mu$. The particle is water-swollen to make it equivalent to 0.01% of solids content before being subjected to testing by adding to water. The particle size after the water-swelling is approximately 50$\mu$.

(2) Example of water to be treated 10 g of a soluble starch reagent are added to 1,000 ml of distilled water and the water is heated for 30 min. to dissolve the reagent. 10 l of the solution are obtained by adding distilled water and are used for water to be treated.

500 ml of the water to be treated are added to a beaker. A predetermined amount of the polymer manufactured in Example (1) is added to the water being processed, agitated for 2 min, and set still for 10 min. COD is skimmed and then examined. The Table below shows the testing conditions and results. Comparative Example Water to be processed is subjected to testing as in Example except that aluminum sulfate and melamine-/aldehyde acid colloidal solution, instead of the water-swelling cationic polymer particles, are used. The testing conditions and results are also shown in the following Table.

TABLE

| Additive | Amount added (ppm) | COD (ppm) | Removal Rate of COD (%) |
|---|---|---|---|
| Comparative Examples: | | | |
| — | — | 630 | — |
| $Al_2(SO_4)_3$ 18$H_2O$ | 3000 | 360 | 42.9 |
| | 5000 | 145 | 77.0 |
| | 7000 | 120 | 81.0 |
| Melamine aldehyde acid colloidal solution (as pure ingredient) | 500 | 215 | 65.9 |
| | 1000 | 135 | 78.6 |
| | 3000 | 82 | 87.0 |
| | 4000 | 91 | 85.6 |
| | 5000 | 112 | 82.2 |
| Working Examples: | | | |
| Water-swelling cationic polymer particles (as pure ingredient) | 30 | 230 | 63.5 |
| | 50 | 64 | 89.8 |
| | 70 | 48 | 92.4 |

Note: The water-swelling cationic polymer particle in the table is a copolymer of methyl chloride quaternary compound of dimethylaminoethylmethacrylate and methylenebisacrylamide.

As is obvious from the above table, the removal rate of COD under the method according to the present invention is superior in efficiency to the comparative example, notwithstanding the fact the amount of the polymer additive is smaller.

The starch, particularly the soluble starch contained in the starch-containing water, can be removed simply and efficiently using small amounts of the polymer additive. Since no pH adjustment is required, moreover, the method according to the present invention offers excellent economic efficiency, obviating the need to install new facilities.

What is claimed is:

1. A method of treating starch-containing water to remove water soluble starch therefrom which comprises adding water-swellable, cationic, polymer particles to said starch-containing water, said water-swellable cationic polymer particles being a polymer of a cross-linkable monomer and either a cationic vinyl monomer or a cationic vinyl monomer and a nonionic vinyl monomer, and wherein said cationic vinyl monomer is a neutral salt or quaternary of a dialkylaminoalkyl(meth)acrylate, a neutral salt or quaternary of dialkylaminoalkyl(meth)acrylamide; diallyldialkylammonium chloride; acryloxyalkyltrialkylammonium chloride or a N,N-dialkylaminoalkyl(meth)acrylate;

and removing said polymer particles having starch thereon from said water.

2. The method according to claim 1 wherein the nonionic monomer is (meth)acrylamide; N-vinylpyrrolidone or N,N-dialkyl(meth)acrylamide.

3. The method according to claim 2, wherein the cross-linkable monomer is N,N-methylenebis(meth)acrylamide, divinylbenzene, an acrolein, methyl acrylamide glycolate methyl ether, polyethyleneglycolate(meth)acrylate; glycidyl acrylate, glyoxal or epichlorohydrin.

* * * * *